(12) United States Patent
Høj

(10) Patent No.: US 10,047,751 B2
(45) Date of Patent: Aug. 14, 2018

(54) HEATING CIRCULATING PUMP

(75) Inventor: Finn Mathiesen Høj, Aarhus N (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 339 days.

(21) Appl. No.: 14/004,599

(22) PCT Filed: Feb. 24, 2012

(86) PCT No.: PCT/EP2012/053218
§ 371 (c)(1),
(2), (4) Date: Oct. 18, 2013

(87) PCT Pub. No.: WO2012/123235
PCT Pub. Date: Sep. 20, 2012

(65) Prior Publication Data
US 2014/0050603 A1 Feb. 20, 2014

(30) Foreign Application Priority Data
Mar. 12, 2011 (EP) .................................... 11002073

(51) Int. Cl.
*F04D 13/06* (2006.01)
*F04D 29/02* (2006.01)
(Continued)

(52) U.S. Cl.
CPC ........... *F04D 13/06* (2013.01); *F04D 13/064* (2013.01); *F04D 13/0686* (2013.01); *F04D 29/026* (2013.01); *F04D 29/426* (2013.01); *F04D 29/5813* (2013.01); *H02K 5/10* (2013.01); *H02K 5/225* (2013.01); *H02K 11/40* (2016.01); *F05D 2230/20* (2013.01); *F05D 2230/232* (2013.01);
(Continued)

(58) Field of Classification Search
CPC .... F04D 13/06; F04D 13/064; F04D 13/0686; F04D 29/026; F04D 29/426; F04D 13/0693; F04D 29/5813; F04D 29/406; H02K 5/225; H02K 11/40; H02K 2211/03; H02K 5/10; H02K 3/50; H02K 5/128
See application file for complete search history.

(56) References Cited

U.S. PATENT DOCUMENTS 4,475,873 A * 10/1984 Jensen .................... H02K 3/50
310/71
4,851,725 A 7/1989 Keck
(Continued)

FOREIGN PATENT DOCUMENTS

DE 10 2004 030 721 B3 10/2005
DE 10 2005 021 726 A1 11/2006
(Continued)

*Primary Examiner* — Dominick L Plakkoottam
(74) *Attorney, Agent, or Firm* — McGlew and Tuttle, P.C.

(57) ABSTRACT

A heating circulating pump includes a pump housing (1) containing a pump impeller driven by an electric motor. The stator thereof is arranged in a motor housing (8) connected to the pump housing (1). A terminal box (12) is arranged on the motor housing (8), for electrically connecting the motor winding and for receiving electrical and/or electronic components of the motor control system. The terminal box (12) includes at least two parts that are bonded to each other, and the terminal box (12) is designed such that it is sealed from the motor and from the surrounding environment.

20 Claims, 9 Drawing Sheets

(51) Int. Cl.
*F04D 29/42* (2006.01)
*H02K 5/22* (2006.01)
*H02K 5/10* (2006.01)
*H02K 11/40* (2016.01)
*F04D 29/58* (2006.01)

(52) U.S. Cl.
CPC ...... *F05D 2300/43* (2013.01); *H02K 2203/03* (2013.01)

(56) References Cited

U.S. PATENT DOCUMENTS

| | | | |
|---|---|---|---|
| 5,049,770 A * | 9/1991 | Gaeth | F02B 63/06 310/43 |
| 5,521,785 A * | 5/1996 | Schmidt | H02K 5/225 361/707 |
| 2002/0021051 A1 * | 2/2002 | Jacobsen | H02M 7/003 310/68 R |
| 2003/0088076 A1 | 5/2003 | Koshida et al. | |
| 2005/0167025 A1 | 8/2005 | Kobayashi et al. | |
| 2006/0153677 A1 * | 7/2006 | Winkler | F04D 29/057 415/220 |
| 2008/0050960 A1 * | 2/2008 | Koelle | G01R 1/203 439/345 |
| 2008/0277619 A1 | 11/2008 | Matsumoto et al. | |
| 2010/0090635 A1 * | 4/2010 | Andersen | F04D 29/628 318/490 |
| 2011/0157862 A1 | 6/2011 | Ellegaard | |
| 2011/0241454 A1 * | 10/2011 | Staehr | F04D 29/406 310/43 |
| 2013/0199103 A1 * | 8/2013 | Raschegewski | B23P 19/047 49/506 |

FOREIGN PATENT DOCUMENTS

| | | |
|---|---|---|
| DE | 10 2007 022 070 A1 | 11/2008 |
| EP | 2 164 153 A1 | 3/2010 |
| EP | 2 166 230 A1 | 3/2010 |
| WO | 2005/071001 A1 | 8/2005 |
| WO | 2006/119938 A1 | 11/2006 |
| WO | 2008/019818 A1 | 2/2008 |
| WO | 2008/135103 A1 | 11/2008 |

* cited by examiner

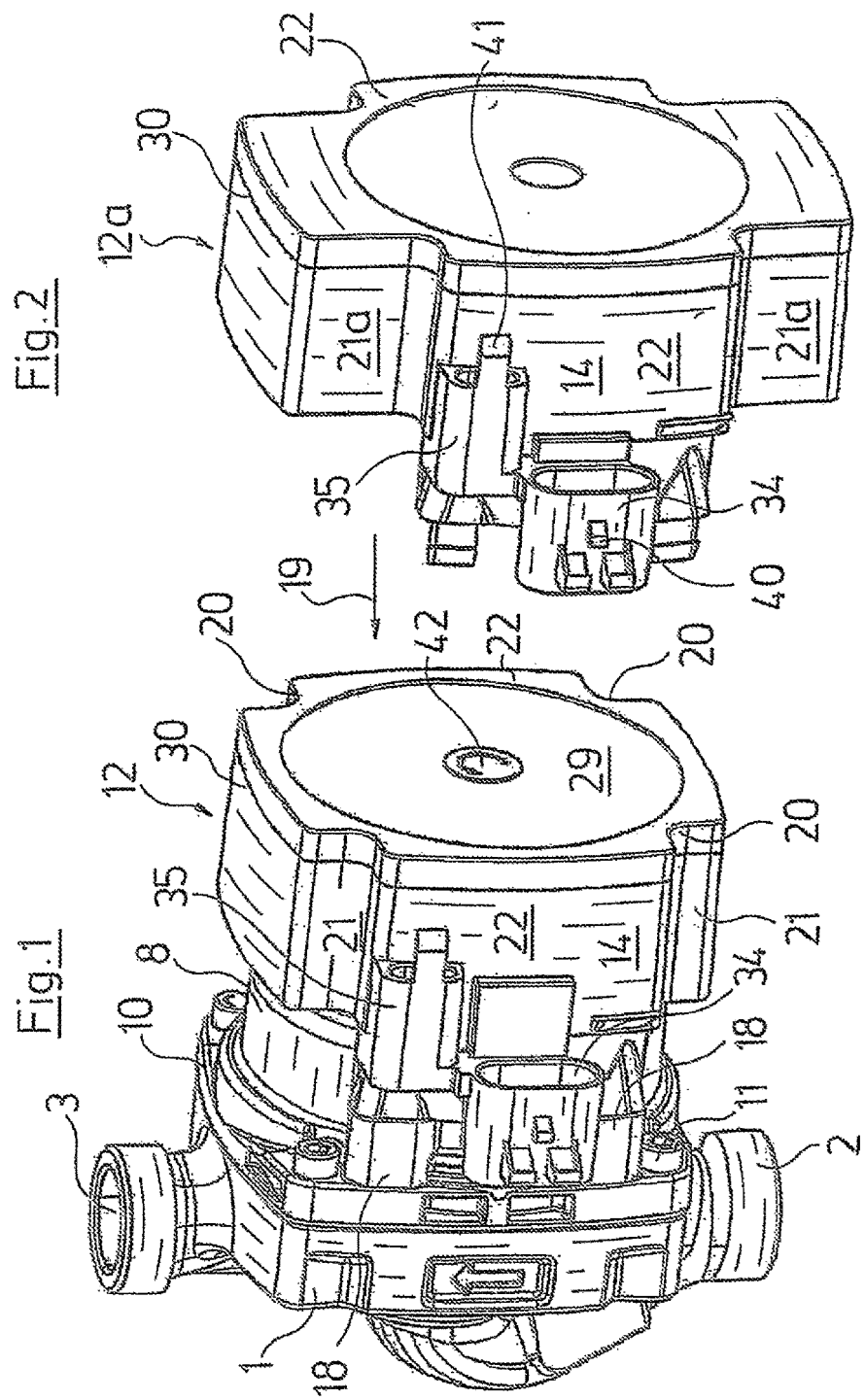

HEATING CIRCULATING PUMP

CROSS REFERENCE TO RELATED APPLICATIONS

This application is a United States National Phase Application of International Application PCT/EP2012/053218 filed Feb. 24, 2012 and claims the benefit of priority under 35 U.S.C. § 119 of European Patent Application EP 11002073.2 filed Mar. 12, 2011, the entire contents of which are incorporated herein by reference.

FIELD OF THE INVENTION

The invention relates to a heating circulation pump with a pump housing with a pump impeller which is arranged therein and which is driven by an electric motor whose stator is arranged in a motor housing connected to the pump housing, and with a terminal box which is arranged on the motor housing and is for the electric connection of the motor winding and for receiving electrical and/or electronic components of the motor control.

BACKGROUND OF THE INVENTION

Such heating circulation pumps are counted as belonging to the state of the art. They typically comprise a pump housing with a suction nozzle and a pressure nozzle as well as a pump impeller arranged therein. An electric motor whose shaft carries the pump impeller is provided for the drive of the pump. The stator surrounding the rotor is arranged in a housing which at its side facing the pump housing comprises a flange or similar connection element, via which the motor housing and in particular the stator housing is connected to the pump housing. A terminal box which is arranged at the axial side of the stator housing which is away from the pump housing is provided for the electric connection of the motor. The terminal box typically also comprises the motor electronics, thus for example a frequency converter. A heating pump of the above-mentioned type is known for example from DE 10 2004 030 721 B3.

SUMMARY OF THE INVENTION

Such heating circulation pumps of a small or medium construction type are produced in large-scale manufacture, which is why even the smallest improvements can entail significant savings with regard to manufacture and/or assembly. On the one hand one always strives to technically further improve these pumps and to design them in a more reliable manner, but on the other hand to reduce the manufacturing and assembly costs.

The heating circulation pump according to the invention comprises a pump housing with a pump impeller which is arranged therein and which is driven by an electric motor, whose stator is arranged in a motor housing connected to the pump housing. A terminal box which is provided and designed for the electrical connection of the motor winding and for receiving electrical and/or electronics components of the motor control is arranged in the motor housing. According to the invention, the terminal box comprises two parts which are connected to one another with a material fit, wherein the terminal box is designed in a sealingly closed manner to the motor and to the surroundings.

The basic concept of the invention is to design the terminal box which in particular receives the moisture-sensitive motor electronics, in a sealingly closed manner and specifically to the motor as well as to the surroundings. In order to also ensure this with regard to the terminal box components, according to the invention, one envisages connecting these to one another with a material fit. With regard to these components, it is typically the case of a terminal box basis body which is closed by a cover, but the terminal box can also be constructed differently, for example in a diagonally divided manner. A hermetically sealed closure of the terminal box can be ensured in a reliable manner and over the longer term, due to the fact that these components are connected to one another with a material fit, which typically however is not necessarily accomplished on the part of the factory, by which means the service life of the sensitive electrical and/or electronic components of the motor control which are arranged in the terminal box, can be significantly improved, in particular in humid and harsh environments. Moreover, the material-fit connection of the terminal box parts is inexpensive, since one can completely make do without seals between these components. Inasmuch as this is concerned, inherently of the system, unsealedness due to the ageing of seals is ruled out. Moreover, such an irreversible closure of the terminal box has the advantage that no special provisions reducing the danger of an electric shock need to be made at all within the terminal box, as is typically the case with terminal boxes with an unscrewable terminal box cover. Finally, the solution according to the invention permits the simple exchange of the terminal box with the motor control located therein, and a repair is not possible already due to the basically non-envisaged opening ability of the terminal box, and if possible at all, then only in a specialist workshop.

It is particularly advantageous if the terminal box is formed from at least two components consisting of thermoplastic plastic, thus for example of a terminal box basis body and a cover which are connected to one another in a sealed and non-releasable manner by way of welding. Such thermoplastic plastic parts can be welded to one another in a reliable and sealed manner with only little technical effort, by which means on the one hand the manufacturing costs can be reduced due to making do without a seal as well as without the otherwise usual screw connections, and moreover a hermetically sealed terminal box can be formed.

Thereby, the terminal box is advantageously designed such that it consists of a basis body in the form of a container which is open at one side and which is closed by a cover. The cover can yet also extend over a part of the side wall of the terminal box, if the leading of the welding seam can be favorably realized in this region. The terminal box is advantageously formed from plastic injection molded parts due to the already mentioned high piece numbers with heating circulation pumps, and these parts are predestined for large-scale manufacture and are moreover weldable since they are thermoplastic.

It is particularly with modern heating circulation pumps of smaller and medium construction sizes which operate with comparatively slim permanent magnet rotors, that it is advantageous to arrange the terminal box on the axial side of the motor housing which is away from the pump housing, since then on the one hand sufficient construction space can be formed for the motor electronics, and one the other hand one can grip completely or partly over the stator of the motor as the case may be, in order with regard to the fashioning, to achieve an aesthetic appearance and to be able to largely make do without a machining of the motor housing.

The sealed closure of the terminal box can be particularly advantageously applied with such motors which are designed as wet-runners. In order, given a blockage of the rotor, to be able to also start this if the electromagnetic force alone is not sufficient, it is useful to render the motor-side shaft end accessible via a closable housing opening, as is provided with a multitude of heating circulation pumps by way of a threaded plug located in the face-side axial wall. In order to ensure such an arrangement even with an arrangement of the terminal box on the axial side of the motor, according to an advantageous further development of the invention, the terminal box is designed in an annular manner, so that a tool or likewise can be led through the central recess of the terminal box, in order to open the housing opening of the motor housing, rotate the shaft and close the housing opening again.

The terminal box base is advantageously designed in a closed manner, in order to ensure that no moisture can penetrate into the terminal box base from the motor side. Thereby, it is advantageous to arrange the terminal box base in a manner distanced to the axial end wall of the motor, in order to achieve a thermal decoupling.

In order to design the terminal box base on the one hand in a closed manner, but to provide the contacts necessary for the electrical connection to the motor winding, according to a further development of the invention, one envisages molding these contacts into the terminal box base, i.e. arranging these contacts in the tool when injection molding, such that they are formed as one piece with the respective terminal box component after the injection molding procedure. Thereby, usefully the leading of the contacts out of the terminal box is designed such that a part of the electrical plug-in connection is formed, whose other part is formed on the motor side for the electrical connection to the motor winding. Such an electrical plug-in connection has the advantage that the components can be exchanged, if for example the motor winding is faulty or an error in the motor control is present.

According to a further development of the invention, one envisages molding electrical contacts into a side wall of the terminal box and forming them there into part of a plug-in connection as a plug or as a socket, whose other part is formed by the correspondingly formed socket or the correspondingly formed plug of an electric connection lead. With this, the terminal box according to the invention can be connected without a tool and specifically on the motor side as well as on the mains side.

It is advantageous to fasten the terminal box on the motor housing and/or pump housing by way of a snap connection, in order to not only be able to ensure a toolless connection, but also a toolless assembly. The snap connection is thereby advantageously designed such that it cooperates with the electrical plug-in connection, or the electrical plug-in connection forms a part of the snap connection or one of several snap connections. With such a design, the mechanical connection between the terminal box and the motor housing as well as the electrical connection between the terminal box and the motor winding can be created by way of simply sticking the terminal box onto the motor housing. The snap connection can also be provided between the terminal box and the pump housing, if parts of the terminal box engage over the motor housing.

Moreover, according to a further development of the invention, a heat distributor can be molded in the terminal box wall, for example in order to be able to lead away waste heat arising in the terminal box, to the outside in a targeted manner, in particular to a cooling body which is arranged there. Such a heat distributor is advantageously molded on a side of the terminal box housing which does not point to the motor housing. Such a heat distributor can be formed by a molded-in metal body, but a cooling body can also be integrated into the housing wall, wherein then a thermally conductive connection to the heat-producing power electronics components is given within the terminal box. Alternatively, such a heat distributor can also be stuck on the outer side of the terminal box by way of a snap connection.

It is particularly with large piece numbers that it would be even more favorable with regard to manufacturing technology, to manufacture the heat distributor of thermally conductive plastic and to inject this together with the component forming part of the terminal box, with the two-component injection molding method.

It is particularly advantageous if the terminal box is also formed from two components which are connected to one another by way of laser welding, since a reliably sealed welding connection can be created in a simple and rapid manner with such a welding method. Thereby, usefully one welds through one of the two components, i.e. one of the components is to be transparent to the radiation of the laser and the other components is to be non-transparent. The laser beam is then directed through the component which is transparent permeable to the laser beam, onto the component which is non-transparent to the laser beam, by which means the material is melted in the region of the separating gap and is intimately connected to one another, Thereby, it is particularly advantageous if the terminal box basis body, thus the container which is open on one side, is formed from a material which is non-transparent to the laser beams, and the cover closing this is formed from a material which is transparent to it, since the welding can then be effected from the outer side of the terminal box which is easily accessible and is away from the motor. With this, the weld seam can be applied at practically any suitable point in time of manufacture, be it that the terminal box with the electrical and electronic components located therein are firstly manufactured and then hermetically closed off by way of welding, or also that this hermetic closure is not effected until after the assembly on the motor. This laser welding method is also particularly advantageous since with this, locations which are otherwise difficulty accessible can be welded, such as in the region of the central recess of the terminal box.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a simplified perspective representation of a heating circulation pump according to the invention;

FIG. 2 is a perspective representation according to FIG. 1 showing a terminal box with radial widenings;

DESCRIPTION OF THE PREFERRED EMBODIMENTS

Figure 3:
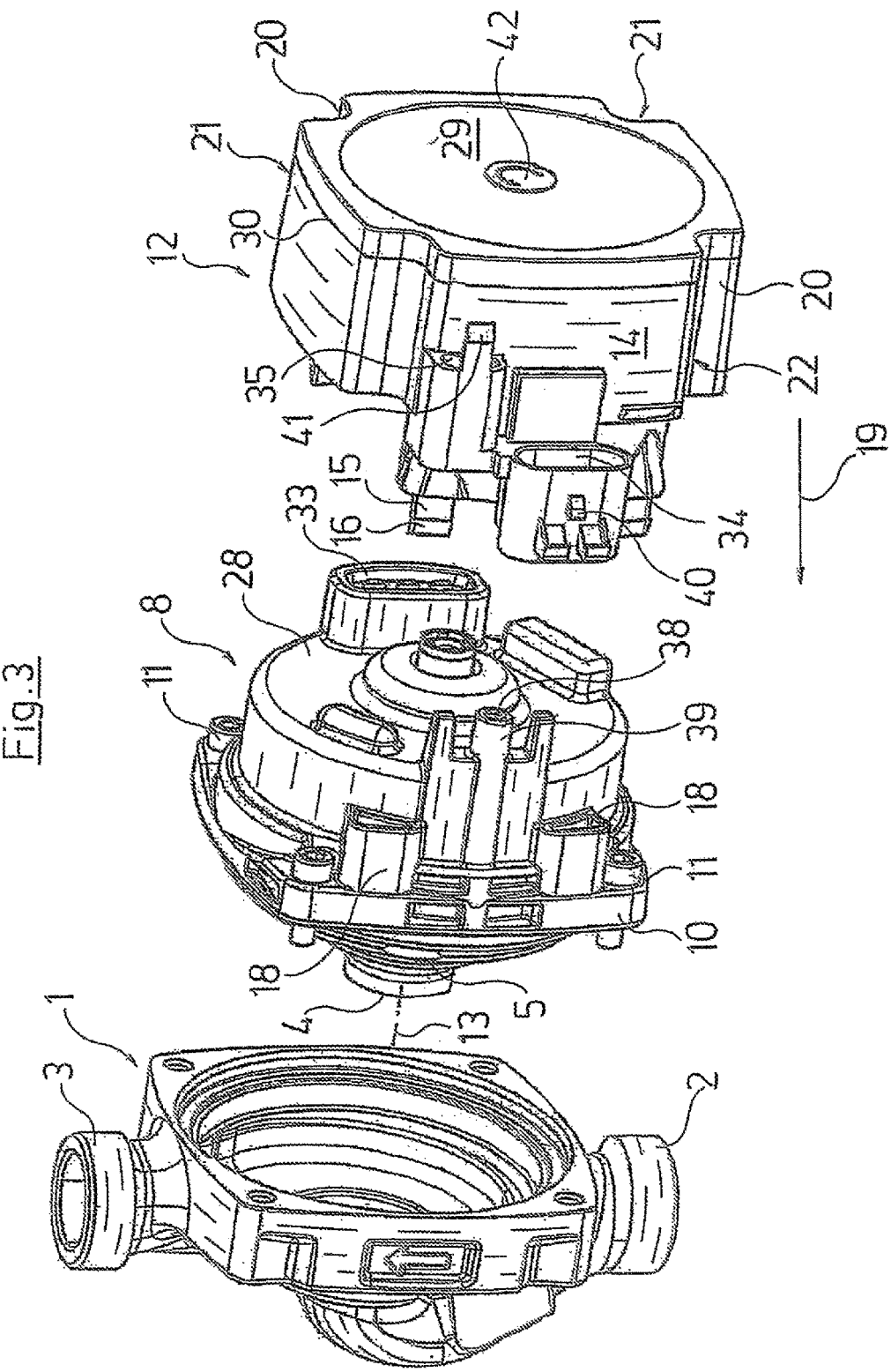
FIG. 3 is a perspective exploded representation of the pump, motor and terminal box.
Figure 8:
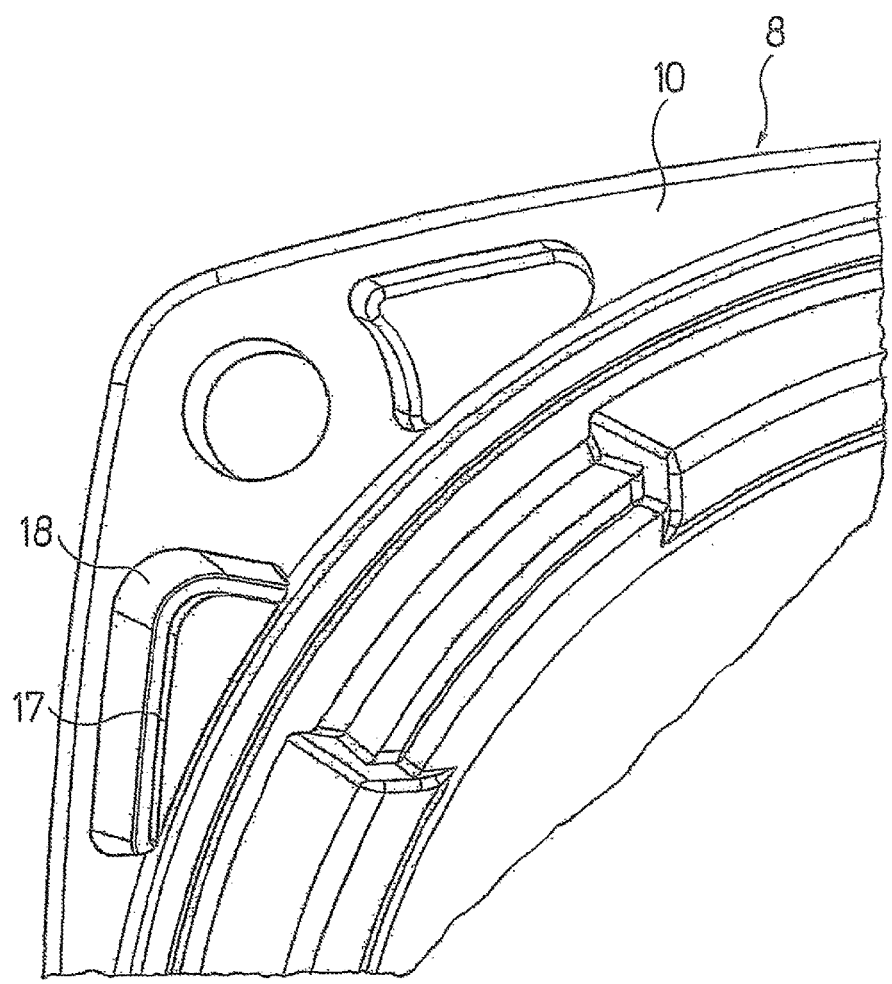
FIG. 8 is an enlarged representation of a view of the corner region of the motor housing flange, from the pump side.

Referring to the drawings in particular, the heating circulation pump represented by way of FIGS. 1 and 3 and 8 comprises a centrifugal pump with a pump housing 1 with a suction nozzle 2 and with a pressure nozzle 3 with a channel guidance formed therebetween which leads the fluid coming from the suction nozzle 2 to a suction port 4 of a pump impeller 5 which is mounted within the pump housing 1 and whose driven side connects to a channel leading to the pressure nozzle 3.

The heating circulation pump moreover comprises a motor, here a wet-running motor, whose rotor 6 runs in a can 7 which is filled with fluid. The can 7 is surrounded by a stator, i.e. by the motor windings arranged around the can 7 on the peripheral side, as well as by a motor housing 8 receiving the stator. The rotor 6 comprises a central shaft 9 which extends to into the pump housing 1 and carries the pump impeller 5, so that the rotational movement of the rotor 6 is transmitted onto the pump impeller 5.

The motor housing 8 at its side facing the pump housing 1 comprises a flange 10, with which it is connected to the pump housing 1 and is sealingly and firmly connected to the pump housing 1 in the corner regions of the flange via four screws 11. In the shown embodiment, the pump housing 1 and the motor housing 8 consist of metal and are manufactured as cast components.

With regard to the heating circulation pumps represented here, the motor housing 8 is designed as metallic cast housing. For the present invention however, the housing can also be formed by a molded stator, as is then the case if the stator winding is molded into plastic. The motor housing can also be manufactured as an injection molding part. It is to be understood that the earthing contact described in detail further below is then integrated separately within the plastic and is connected in an electrically conductive manner to the stator lamination bundle and the can of the motor which is then formed from metal.

The heating circulation pump furthermore comprises a terminal box 12 which consists of plastic, is attached on the axial side of the motor housing 8 which is away from the pump housing 1, and partly engages over the motor housing 8 to its axial side in a complete and radial manner, i.e. on the peripheral side.

The spatial terms axially and radially which have being used up to now and are used hereinafter relate to the rotation axis 13 of the rotor 6 or of the pump impeller 5. The axial sides are thus the sides which run essentially perpendicularly to the rotation axis 13, wherein radial surfaces are the surfaces which extend parallel to the rotation axis.

The motor housing 8 in the flange region comprises a rounded essentially square cross section, whereas the remaining part of the motor housing 8, thus the part connecting to the terminal box 12 has an essentially circularly round cross section and thus has a cylinder-surface-shaped peripheral surface. Whereas the pump housing 1 and the motor housing 8 are releasably connected to one another by way of four screws 11, the terminal box 12 consisting of plastic is fastened on the motor housing 1 by way of snap connections. For this, the terminal box 12 comprises four tongues 15 which extend out of the side walls 14 of the terminal box to the pump housing 1, at whose ends lateral snap projections 16 are arranged, which engage behind snap recesses 17 in the motor housing 8, said snap recesses being integrally formed on the motor housing 8 in the region of the flange 10. These snap recesses 17 are in each case formed by a step in a tubular guide 18 pointing from the flange 10 to the terminal box 12, on the motor housing 8 (see FIG. 8).

The tongues 15 get into the guides 18 which are arranged aligned thereto, on applying the terminal box 12 onto the motor housing 8 in the axis direction, thus in the stick-on direction 19, wherein the snap projections 16 due to the transverse defection of the tongues move laterally inwards on and past the steps forming the snap recesses 17 and after passing past these steps outwards due to the elastic restoring of the tongues 15 and thus hold the terminal box 12 on the motor housing 8.

The terminal box 12, seen in the direction of the rotation axis 13, has an essentially rectangular outer contour and in the corner regions, thus in the region of imagined axial extensions of the screws 11, is designed in a recessed manner, so that the screws 11 are accessible to a tool applied from the axial direction when the terminal box 12 is applied. These corner regions are characterized at 20.

Horizontal edge regions 21 and vertical edge regions 22 of the terminal box 12 result with this shaping and with the represented vertical installed condition (suction nozzle 2 and pressure nozzle 3 lie vertically above one another).

The vertical edge regions 22 with the represented embodiment are used for leading out electrical contacts, whereas the horizontal edge regions 21 are used for the arrangement of the electronic components within the terminal box. Since constructionally equivalent pumps can be equipped with electric motors with different motor electronics, then as is clear by way of comparing the representation according to FIGS. 1 and 2, when using different terminal boxes which differ only in the radial extension of the horizontal edge regions 21, the inner volume of the terminal box can be varied without having to change the electric connections, and specifically neither on the motor side nor on the terminal box side. The widened horizontal edge regions in FIG. 2 are characterized at 21a, the terminal box at 12a.

The electrical contacts are arranged in the vertical edge regions 22, and specifically, seen in the axis direction of the terminal box 12 in the direction to the pump housing 1, the contacts 23 leading to the motor winding are arranged in the right vertical edge region 22 and the contacts 24 led out to the plug-in connection from the electrical connection of the motor are arranged in the left vertical edge region 22. These contacts 23 and 24 are to be recognized in the sectioned representation according to FIG. 6. They are formed in each case of sheet metal, thus as punched parts and are designed the same in a grouped manner, i.e. all contacts 23 are constructionally identical to one another as well as all contacts 24 constructionally identical amongst one another.

Figure 4:
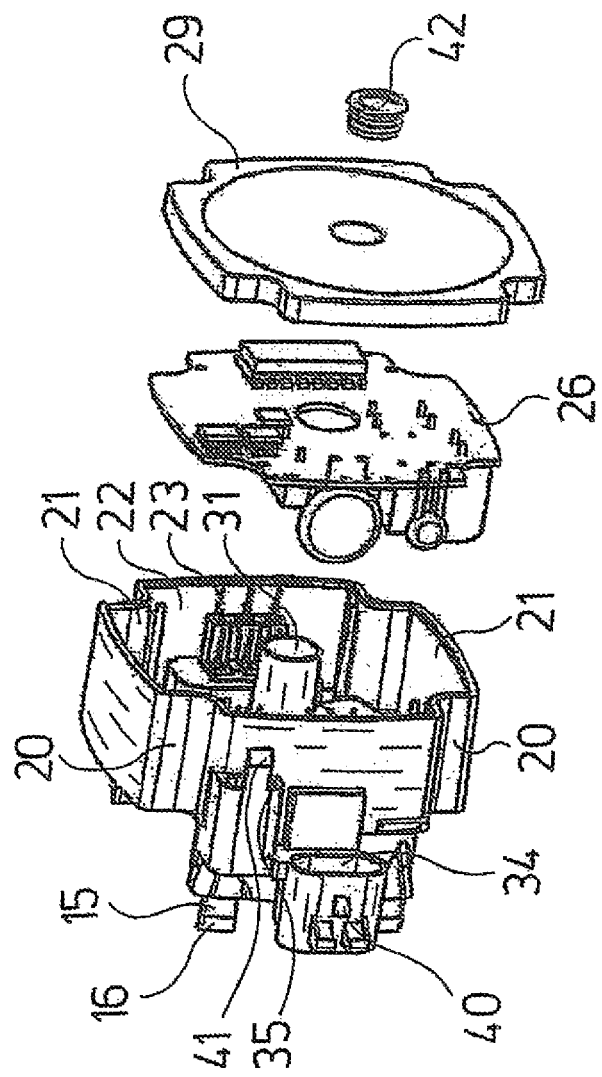
FIG. 4 is a perspective exploded representation of the terminal box according to FIG. 3 showing the construction.
Figure 5:
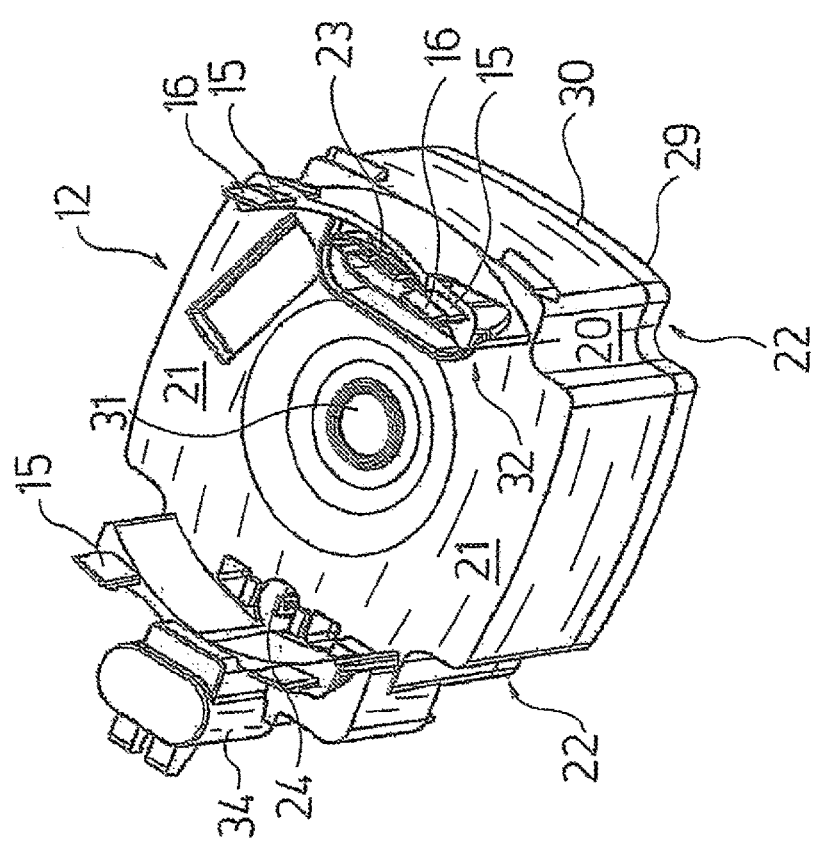
FIG. 5 is a perspective view of the terminal box from below.
Figure 6:
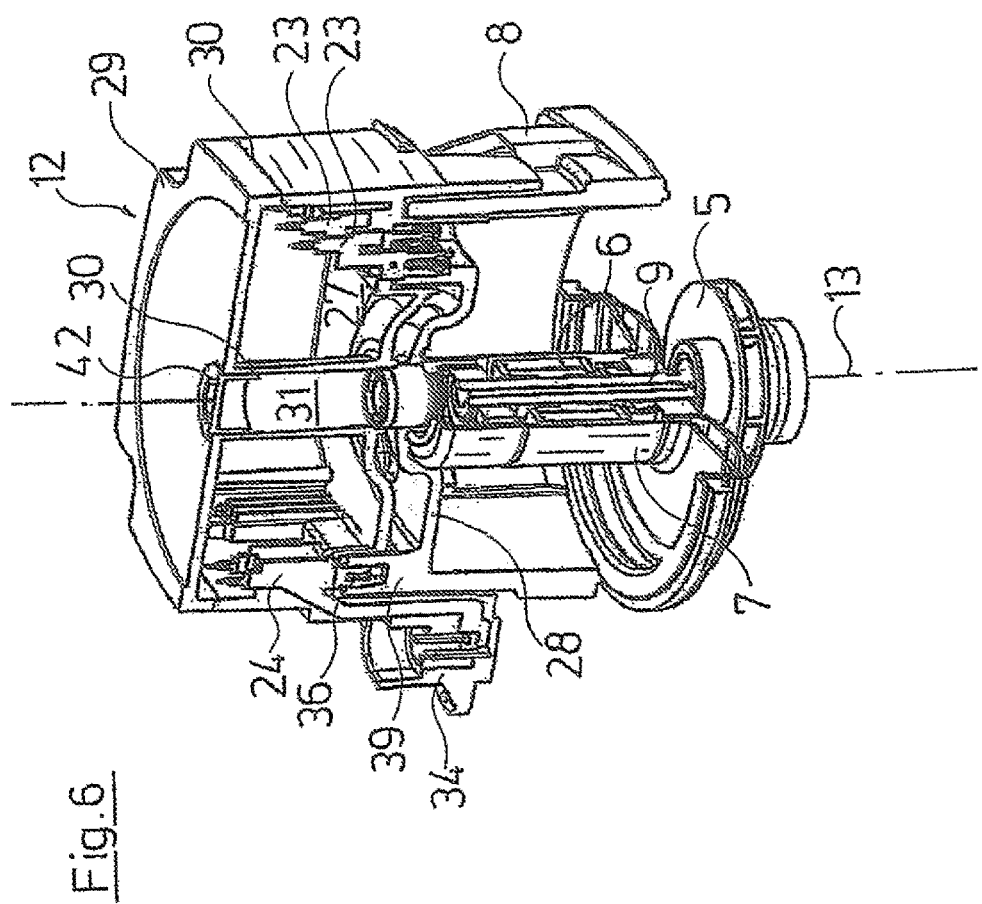
FIG. 6 is a perspective longitudinal sectional representation of the terminal box and motor with an applied pump impeller.

All contacts 23 and 24 as well as the further contacts 25 which are arranged on the left side in the vertical edge region 22 and which serve for the motor control, end in the terminal box 12 on a circuit board 26 which for reasons of a better overview is not shown in the representation according to FIG. 6, but can be seen in the exploded representation according to FIG. 4 and which carries the electrical and electronic components of the motor control, here in particular the frequency converter.

The contacts 23, 24 and 25 are compactly molded into the terminal box 12 formed from thermoplastic plastic, and specifically the contacts 23 into the base 27 of the terminal box 12, and the contacts 24 and 25 into the base 27 or the side wall which is adjacent thereto.

The base 27 of the terminal box 12 is designed in a completely closed manner and is designed distanced to the axial wall 28 of the motor housing 8 (see FIG. 6). The base 27 merges into the side walls 14 which are likewise closed, the axial end of the side walls 14 is closed off by a cover 29 which is likewise designed in a closed manner (closed with respect to the inside of the terminal box). The cover 29 is connected with a material fit by way of a peripheral welding seam 30 to the basis body of the terminal box 12 which consists of the base 27 and walls 14. In this manner, the inside of the terminal box is not only sealed but hermetically closed off, i.e. the sensitive electronics which are located therein are reliably protected from the penetration of dust, water and gases.

The welding seam 30 is formed by way of laser welding from the cover side. For this, the cover 29 is manufactured of a material which is transparent to the laser beam, whereas the basis body, thus the base 27 and the side walls 14 are manufactured of a material which is essentially not transparent to the laser beam. The welding is effected in a manner such that the laser beam is directed from the cover side onto the face sides of the side walls 14 which face the cover. Thereby, the laser beam gets through the cover 29 which is transparent to the laser beam, up to the face sides of the side walls 14, where it melts the material which due to the effect of heat also melts with the cover material and in this manner forms a hermetic weld connection between the side walls 14 and the cover 29, by which means the terminal box 12 is closed off to the outside in a hermetically sealed manner. Thereby, the welding is not only effected in the region of the outer lying walls 14 but also in the region of the central recess 31, thus at a side which is otherwise extremely poorly accessible for the welding.

A central recess 31 runs through the terminal box 12 and in the axial direction, is closed off by a plug 42 and is not connected to the inside of the terminal box. This recess 31 leads to an opening in the axial wall 28 of the motor housing 8, said opening likewise being closed by a screw and via which the free end of the shaft 9 is accessible, in order given a blockage of the rotor 6, to be able to freely rotate this by hand. The screw closing this opening is designed as a type of grub screw with a hexagonal socket, wherein the hexagonal socket receiver is designed such that the screw remains on the tool on removal, so that this screw can be removed and then the shaft 9 can be rotated by way of a further tool, on removing the plug 42 by way of a key. The openings are then closed again in the reverse sequence. The recess 31 thus passes through the terminal box 12 in the axial direction, so that a hermetically closed annular space results in the terminal box 12.

Inasmuch as it relates to the contacts 23 for connection to the motor winding, these are recessed in the manner of a socket 32 into the base of the terminal box 12, and specifically in the right vertical edge region 22. A plug 33 projecting axially on the axial wall 28 to the terminal box 12 is formed on the motor housing 8 and this plug on sticking the terminal box 12 onto the motor housing 8 is connected to the socket 32, by way of which the electric connection between the terminal box 12 and the motor winding is created.

Figure 7:
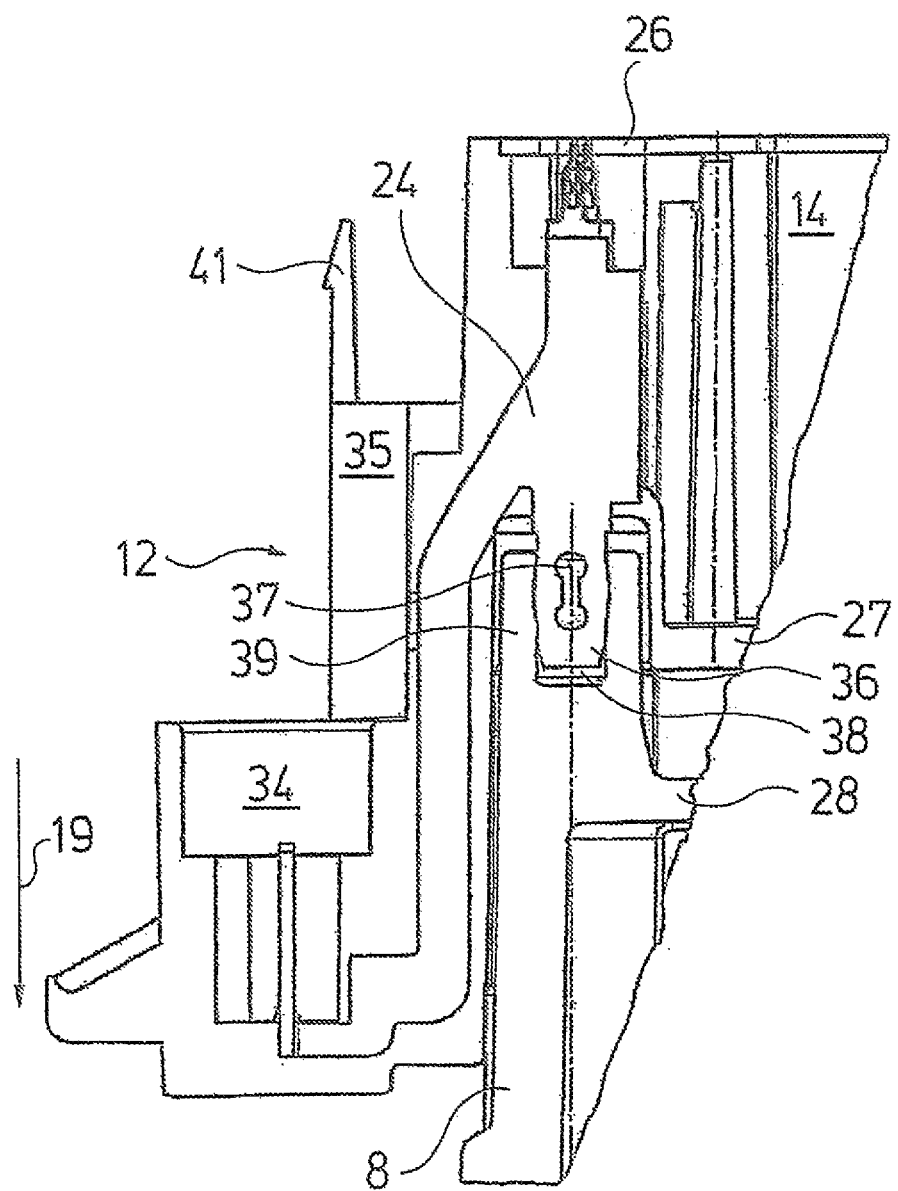
FIG. 7 is an enlarged representation of a longitudinal section in the region of earthing (ground) contact between the terminal box and the motor.

The contacts 24 with one leg are led to a socket 34 and the contacts 25 to a socket 35, on the oppositely lying left side of the vertical edge region 22 of the terminal box 12. One of the contacts 24, specifically the contact represented in FIG. 7, is an earthing contact and serves for connecting the metallic motor housing 8 to the corresponding earthing connection of the socket 34 or to the corresponding earthing connection on the circuit board 26 within the terminal box 12. For this, the contact 24 on one leg comprises a plug-in part 36 which has a slightly cambered shape in the plane of the sheet metal as well as a central longitudinal recess 37 in the plug-in direction of the plug-in part 36. A socket-like recess 38 in an axial prominence 39 on the axial wall 28 of the motor housing 8 is provided in a manner aligned to the plug-in part 36 of the earthing contact. The cross-sectional dimension of the recess 38 is slightly smaller than the transverse extension of the plug-in part 36 in the cambered region, so that the plug-in part 36 is deformed at least elastically, possibly also plastically, on inserting the plug-in part 36 into the recess 38, by which means an intimate contact between the plug-in part 36 and the recess 38 in the motor housing 8 and thus a reliable earthing is ensured. The recess 37 is provided so that the plug-in part 36 can also plastically deform as the case may be.

The non-earthing contacts 24 which with regard to the shaping are designed identically to the earthing contact, likewise comprise a plug-in part 36 with a recess 37, but plastic is peripherally molded around them in the region of the plug-in part 36 and a free space is here in the motor side, since the prominence 39 is provided quasi pointwise only in the region of the plug-in part 36 of the earthing contact.

The contacts 24 and thus in particular also the earthing contact which has an intimate connection to the motor housing 8, is designed in a branched manner into two legs, in the base 27 or in the side wall 14 (see FIG. 7) and runs obliquely out of the terminal box towards the pump housing 1, parallel and along the outer periphery of the motor housing 8, but ends at a distance in front of the flange 10 of the motor and is angled by 180° where the contacts 24 together form the socket 34 servings for receiving a connection plug at the end of a cable of an electrical supply lead. The housing of the socket 34 is designed as one piece with the terminal box 12. The socket 34 is arranged in a manner displaced to the terminal box 12, next to the motor housing 8 on the outer periphery of this. A plug engaging into this socket 34 is insertable in the axial direction, and specifically in the direction to the pump housing 1 and then lies next to the terminal box 12, and specifically next to the left vertical edge region 22. The socket 34 comprises a snap projection 40 which is part of a snap connection whose other part is provided on the counter-piece, thus the plug.

The socket 35 which receives the contacts 25 is led out of the terminal box in a similar manner, but through the side wall 14. The socket 35 formed there in the representation according to FIG. 3 bears on the left vertical edge region 22 on the outer periphery of the terminal box 12, but however differently to the socket 34 is not arranged displaced to the motor housing 8, but lies directly next to the terminal box 12. There, the socket 35 comprises a snap projection 41 which secures the plug engaging into this socket, from detachment. The sockets 34 and 35 as is the case with the socket 32 are manufactured as one piece with the terminal box 12 with plastic injection molding method, thus by way of peripherally molding around the contacts 23, 24, 25 on manufacture of the terminal box basis body.

The sockets 34 and 35 are designed as flat sockets in a manner such that their contacts 24 and 25 respectively are in each case located next to one another in a plane arranged essentially parallel to the motor housing 8. The radial construction space next to the motor housing 8 or terminal box 12 is comparatively small due to this arrangement.

Figure 9:
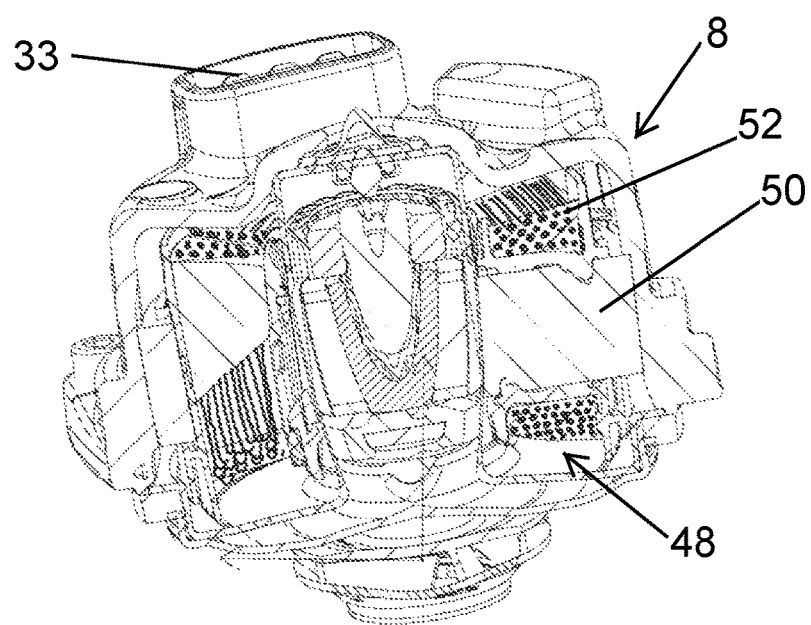
FIG. 9 is a partial sectional view of a motor housing.
Figure 10:
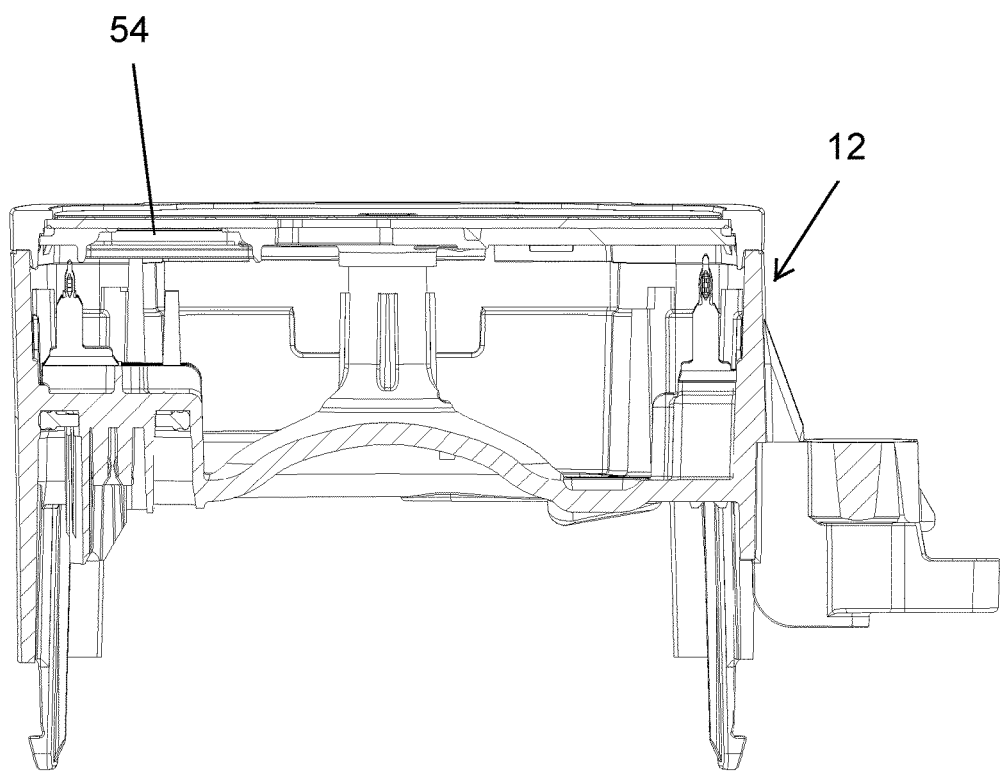
FIG. 10 is a cross-sectional view of the terminal box of FIG. 5.

If the motor housing is not designed as a metallic cast housing, but as a plastic housing or as a cast mass surrounding the stator, then the recess 38 in the prominence of the motor housing is provided with a contact, for example formed by a hollow-cylindrical metallic socket which is electrically conductively connected to the stator lamination bundle and the metallic can 7, in order to ensure the electrical safety of the heating circulation pump for the case that one of these components becomes live due to a stator defect. FIG. 9 is a partial sectional view of the motor housing 8. An electric motor 48, a stator 50 and motor winding 52 are arranged in the motor housing 8. FIG. 10 is a cross sectional view of the terminal box 12. A heat distributor 54 is arranged in the terminal box 12.

While specific embodiments of the invention have been shown and described in detail to illustrate the application of the principles of the invention, it will be understood that the invention may be embodied otherwise without departing from such principles.

The invention claimed is:

1. A heating circulation pump comprising:
an electric motor with a motor winding and stator;
a pump housing;
a motor housing connected to the pump housing;
a pump impeller arranged in the pump housing and driven by the electric motor whose stator is arranged in the motor housing; and
a terminal box arranged on the motor housing, the terminal box being provided for the electric connection of the motor winding and for receiving electrical and/or electronic components of a motor control, the terminal box comprising at least two parts which are connected to one another with a material substance connection, and that the terminal box is designed in a sealingly closed manner to the motor and to the surroundings, said terminal box comprising a completely closed terminal box interior, a terminal box electrical contact and a terminal box snap connection interface, said completely closed terminal box interior being impermeable to fluid, said motor housing comprising a motor housing interior and a motor housing snap connection interface, each of said terminal box electrical contact, said terminal box snap connection interface and said motor housing snap connection interface being located at a position outside of said motor housing interior and said completely closed terminal box interior, said terminal box snap connection interface cooperating with said motor housing snap connection interface to mechanically connect said terminal box to said motor housing, said terminal box snap connection interface comprising connectors formed on an exterior wall of said terminal box.

2. A heating circulation pump according to claim 1, wherein the terminal box is formed from at least said two parts which are formed of thermoplastic plastic and are sealingly and unreleasably connected to one another by way of welding.

3. A heating circulation pump according to claim 1, wherein the terminal box comprises a container which is open at one side prior to being connected to the motor housing and which is closed by a cover.

4. A heating circulation pump according to claim 1, wherein the terminal box is manufactured from plastic injection molded parts.

5. A heating circulation pump according to claim 1, wherein the terminal box is arranged at the axial side of the motor housing which is away from the pump housing, said terminal box electrical contact defining at least a portion of a terminal box electrical contact interface, said motor housing comprising a motor housing electrical interface, said motor housing electrical interface cooperating with said terminal box electrical contact interface to electrically connect said motor control to said electric motor, said motor housing comprising a flange, said flange comprising an outer peripheral surface having a plurality of recesses, said motor housing snap interface comprising said recesses, wherein at least a portion of each of said connectors is arranged in one of said recesses.

6. A heating circulation pump according to claim 1, wherein the motor is designed as a wet-running motor with a motor-side shaft end that is accessible via a closable housing opening of the motor housing and the terminal box is designed in an annular manner.

7. A heating circulation pump according to claim 1, wherein a terminal box base is closed and is arranged distanced to an axial end wall of the motor housing.

8. A heating circulation pump according to claim 1, wherein said terminal box electric contact and at least another terminal box electric contact are molded into a terminal box base and are formed into part of an electric plug-in connection and an electric plug counterpart is formed on the stator side for the electric connection to the motor winding.

9. A heating circulation pump according to claim 1, wherein the terminal box electrical contact and at least another terminal box electrical contact are molded into a side wall of the terminal box and are formed into a part of a plug-in connection as a plug or as a socket.

10. A heating circulation pump according to claim 1, further comprising:
connector elements, the motor housing being connected to the pump housing via at least the connector elements, the terminal box having an outer surface defining connector element recesses in corner regions of the terminal box, the recesses being arranged in a region of an axial extension of the connector elements, wherein the terminal box is fastened on the motor housing by way of at least one snap connection defined by the motor housing snap connection interface and the terminal box snap connection interface, the at least one snap connection comprising at least one snap projection, the at least one snap projection engaging over the motor housing in a radial and an axial manner, the motor housing comprising a flange, wherein flange recesses are provided in a region of the flange, into which the at least one snap projection engages, each snap projection being arranged on a respective tongue which extends from a radially protruding part of the terminal box in an axial direction along the motor housing and the radially protruding part is integrally formed on the terminal box on a side of the terminal box electrical contact.

11. A heating circulation pump according to claim 1, wherein a heat distributor is arranged on or in a terminal box wall at a side which does not face the motor housing.

12. A heating circulation pump according to claim 11, wherein the heat distributor consists of metal.

13. A heating circulation pump according to claim 11, wherein the heat distributor consists of a thermally conductive plastic and is manufactured with the two-component injection molding method together with a component of the terminal box.

14. A heating circulation pump according to claim 1, wherein the at least two parts forming the terminal box are connected to one another by way of laser welding, wherein one of the at least two parts is transparent to a beam of a laser and another one of the at least two parts is non-transparent to the beam of the laser.

15. A heating circulation pump according to claim 14, wherein:
the at least two parts comprise a cover and a container which is open at one side prior to the terminal box being connected to the motor housing and which is closed by the cover; and
the container open at one side is formed of material which is non-transparent for the laser beam and the cover is formed from material which is transparent to the laser beam.

16. A heating circulation pump comprising:
an electric motor with a motor winding and stator;
a pump housing;
a motor housing connected to the pump housing;
a pump impeller arranged in the pump housing and driven by the electric motor; and
a terminal box arranged on the motor housing, the terminal box being provided for the electric connection of the motor winding and for receiving electrical and/or electronic components of a motor control, the terminal box comprising a first part and a second part, the first part being welded to the second part to form a one-piece, integrally connected terminal box structure having a hermetically sealed terminal box interior that is hermetically sealed in a closed manner to the motor and to the surroundings, wherein said sealed terminal box interior is impermeable to liquid and gas, said terminal box comprising a terminal box electrical contact, an inner terminal box electrical and mechanical connector and a terminal box snap connection interface, said motor housing comprising a motor housing interior, an inner motor housing electrical and mechanical connector and a motor housing snap connection interface, said inner terminal box electrical and mechanical connector being connected to said inner motor housing electrical and mechanical connector, at least a portion of said inner terminal box electrical and mechanical connector being arranged in said hermetically sealed terminal box interior, said terminal box electrical contact, said terminal box snap connection interface and said motor housing snap connection interface being located radially outward of an outer peripheral surface of said terminal box, wherein said terminal box electrical contact, said terminal box snap connection interface and said motor housing snap connection interface are at a spaced location from said motor housing interior and said sealed terminal box interior, said terminal box snap connection interface cooperating with said motor housing snap connection interface to mechanically connect said terminal box to said motor housing, said terminal box snap connection interface comprising a plurality of connectors extending from an outer periphery of said terminal box.

17. A heating circulation pump according to claim 16, wherein the first part and the second part formed of thermoplastic plastic and are sealingly and unreleasably connected to one another by a weld, said terminal box electrical contact defining at least a portion of a terminal box electrical contact interface, said motor housing comprising a motor housing electrical interface said motor housing electrical interface cooperating with said terminal box electrical contact interface to electrically connect said motor control to said electric motor, said motor housing snap connection interface comprising a plurality of recesses provided in an exterior portion of said motor housing, each of said recesses receiving at least a portion of one of said connectors to define a mechanical connection of said terminal box to said motor housing at an outer peripheral area of one or more of said terminal box and said motor housing.

18. A heating circulation pump according to claim 16, further comprising:
connector elements, the motor housing being connected to the pump housing via at least the connector elements, wherein the outer peripheral surface of the terminal box defines connector element recesses in corner regions of the terminal box, the recesses being arranged in a region of an axial extension of the connector elements, the connectors engaging over the motor housing in a radial and an axial manner, the motor housing comprising a flange, wherein flange recesses are provided in a region of the flange, each of the flange recesses receiving at least a portion of one of the connectors, each of the connectors being arranged on a respective tongue which extends from a radially protruding part of the terminal box in an axial direction along the motor housing and the radially protruding part is integrally formed on the terminal box on a side of the terminal box electrical contact.

19. A heating circulation pump according to claim 16, wherein a socket is integrally connected to the terminal box, the socket comprising a socket interior space and a socket opening, at least a portion of the terminal box electrical contact being arranged in the socket interior space, the socket opening facing in a direction parallel to a longitudinal axis of the terminal box, whereby a plug is inserted in the socket opening in a plug insertion direction that is parallel to the longitudinal axis of the terminal box.

20. A heating circulation pump according to claim 19, wherein:
one of the first part and the second part is at least partially formed of material which is at least partially transparent for a laser beam and another one of the first part and the second part is formed from material which is non-transparent to the laser beam.

* * * * *